(12) United States Patent
Azim

(10) Patent No.: US 7,724,612 B2
(45) Date of Patent: May 25, 2010

(54) SYSTEM AND METHOD FOR PROVIDING AIDING INFORMATION TO A SATELLITE POSITIONING SYSTEM RECEIVER OVER SHORT-RANGE WIRELESS CONNECTIONS

(75) Inventor: Syed Khalid Azim, Fremont, CA (US)

(73) Assignee: Sirf Technology, Inc., San Jose, CA (US)

( * ) Notice: Subject to any disclaimer, the term of this patent is extended or adjusted under 35 U.S.C. 154(b) by 147 days.

(21) Appl. No.: 11/738,359

(22) Filed: Apr. 20, 2007

(65) Prior Publication Data
US 2008/0258965 A1  Oct. 23, 2008

(51) Int. Cl.
G04C 11/02 (2006.01)
G01S 1/00 (2006.01)
H04B 7/19 (2006.01)
H04B 7/00 (2006.01)

(52) U.S. Cl. .............. 368/47; 342/357.06; 342/357.1; 455/13.2; 455/456.1; 455/502

(58) Field of Classification Search ............ 368/46–48; 342/357.01, 357.06, 357.1, 357.12; 455/456.6, 455/502, 503, 13.2, 67.12
See application file for complete search history.

(56) References Cited

U.S. PATENT DOCUMENTS

| | | | |
|---|---|---|---|
| 5,663,734 A | 9/1997 | Krasner |
| 5,663,735 A | 9/1997 | Eshenbach |
| 5,781,156 A | 7/1998 | Krasner |
| 5,812,087 A | 9/1998 | Krasner |
| 5,825,327 A | 10/1998 | Krasner |
| 5,831,574 A | 11/1998 | Krasner |
| 5,841,396 A | 11/1998 | Krasner |
| 5,874,914 A | 2/1999 | Krasner |
| 5,884,214 A | 3/1999 | Krasner |
| 5,945,944 A | 8/1999 | Krasner |
| 5,999,124 A | 12/1999 | Sheynblat |
| 6,002,363 A | 12/1999 | Krasner |
| 6,016,119 A | 1/2000 | Krasner |
| 6,052,081 A | 4/2000 | Krasner |
| 6,061,018 A | 5/2000 | Sheynblat |

(Continued)

OTHER PUBLICATIONS

Marketing Material: Qualcomm CDMA Technologies—Integrated Solutions—MGP6200™ Multimode GPS Processor (8 pages).

(Continued)

Primary Examiner—Vit W Miska
(74) Attorney, Agent, or Firm—Mark J. Danielson; Pillsbury Winthrop Shaw Pittman LLP (57) ABSTRACT

Systems and methods for obtaining corrected time information in a GPS-enabled device connected to a mobile handset via a short-range wireless network, such as a Bluetooth™ Piconet™. The mobile handset includes a GPS time and a network clock synchronized with a network clock in a short-range wireless network interface in the GPS-enabled device. The GPS-enabled device may send requests for time information to the mobile handset. The mobile handset receives the request and latches the network clock time and the GPS time. The captured network clock time and GPS times are sent to the GPS-enabled device in response to the request. The GPS-enabled device subtracts the captured network clock time from its own network clock time and adds the difference to the captured GPS time to obtain a corrected GPS time.

9 Claims, 7 Drawing Sheets

U.S. PATENT DOCUMENTS

| | | | |
|---|---|---|---|
| 6,064,336 A | 5/2000 | Krasner | |
| 6,104,338 A | 8/2000 | Krasner | |
| 6,104,340 A | 8/2000 | Krasner | |
| 6,107,960 A | 8/2000 | Krasner | |
| 6,111,540 A | 8/2000 | Krasner | |
| 6,131,067 A | 10/2000 | Girerd | |
| 6,133,871 A | 10/2000 | Krasner | |
| 6,133,873 A | 10/2000 | Krasner | |
| 6,133,874 A | 10/2000 | Krasner | |
| 6,150,980 A | 11/2000 | Krasner | |
| 6,185,427 B1 | 2/2001 | Krasner | |
| 6,208,290 B1 | 3/2001 | Krasner | |
| 6,208,291 B1 | 3/2001 | Krasner | |
| 6,215,441 B1 | 4/2001 | Moeglein | |
| 6,215,442 B1 | 4/2001 | Sheynblat | |
| 6,236,354 B1 | 5/2001 | Krasner | |
| 6,236,623 B1 * | 5/2001 | Read et al. | 368/46 |
| 6,239,742 B1 | 5/2001 | Krasner | |
| 6,259,399 B1 | 7/2001 | Krasner | |
| 6,272,430 B1 | 8/2001 | Krasner | |
| 6,289,041 B1 | 9/2001 | Krasner | |
| 6,307,504 B1 | 10/2001 | Sheynblat | |
| 6,313,786 B1 | 11/2001 | Sheynblat | |
| 6,314,308 B1 | 11/2001 | Sheynblat | |
| 6,377,209 B1 | 4/2002 | Krasner | |
| 6,408,196 B2 | 6/2002 | Sheynblat | |
| 6,411,254 B1 | 6/2002 | Moeglein | |
| 6,411,892 B1 | 6/2002 | Van Diggelen | |
| 6,417,801 B1 | 7/2002 | Van Diggelen | |
| 6,421,002 B2 | 7/2002 | Krasner | |
| 6,429,814 B1 | 8/2002 | Van Diggelen et al. | |
| 6,433,731 B1 | 8/2002 | Sheynblat | |
| 6,453,237 B1 | 9/2002 | Fuchs et al. | |
| 6,484,097 B2 | 11/2002 | Fuchs et al. | |
| 6,487,499 B1 | 11/2002 | Fuchs et al. | |
| 6,510,387 B2 | 1/2003 | Fuchs et al. | |
| 6,542,821 B2 | 4/2003 | Krasner | |
| 6,583,757 B2 | 6/2003 | Krasner | |
| 6,597,311 B2 | 7/2003 | Sheynblat | |
| 7,251,199 B2 * | 7/2007 | Eidson | 368/46 |
| 7,340,630 B2 * | 3/2008 | Morris et al. | 713/400 |
| 7,411,869 B2 * | 8/2008 | Pikula et al. | 368/47 |

OTHER PUBLICATIONS

Marketing Material: uNav Microelectronics—uN9×18 Low Power, High Performance GPS Receiver Chipset/uN9×18 GPS Receiver Solution (9 pages).

Marketing Material: uNav Microelectronics, uN9×18 Low Power, High Performance GPS Receiver Chipset (2 pages).

Marketing Material: Global Locate—Hammerhead II™, Single Chip AGPS Solution (2 pages).

Marketing Material/Press Release: Broadcom Introduces Advanced Single-Chip GPS Solution for Mobile Applications (3 pages).

Marketing Material/White Paper: SnapTrack: A Qualcomm Company—SnapTrack's Wireless Assisted GPS™ (A-GPS) Solution Provides the Industry's Best Location System—Location Technologies for GSM, GPRS and WCDMA Networks (Qualcomm CDMA Technologies: Enabling the Future of Communications) (4 pages).

* cited by examiner

SYSTEM AND METHOD FOR PROVIDING AIDING INFORMATION TO A SATELLITE POSITIONING SYSTEM RECEIVER OVER SHORT-RANGE WIRELESS CONNECTIONS

BACKGROUND OF THE INVENTION

1. Field of the Invention

This invention relates generally to positioning systems, and more particularly, to using wireless communications systems to provide aiding information to a positioning system.

2. Related Art

The Global Positioning System (GPS) is an example of a Satellite Positioning System (SATPS), which is maintained by the U.S. Government. GPS is satellite-based using a network of at least 24 satellites orbiting 11,000 nautical miles above the Earth, in six evenly distributed orbits. Each GPS satellite orbits the Earth every twelve hours.

One function of the GPS satellites is to serve as a clock. Each GPS satellite derives its signals from an on board 10.23 MHz Cesium atomic clock. Each GPS satellite transmits a spread spectrum signal with its own individual pseudo noise (PN) code. By transmitting several signals over the same spectrum using distinctly different PN coding sequences the GPS satellites may share the same bandwidth without interfering with each other. The code is 1023 bits long and is sent at a rate of 1.023 megabits per second, yielding a time mark, sometimes called a "chip" approximately once every microsecond. The sequence repeats once every millisecond and is called the coarse acquisition code (C/A code.) Every $20^{th}$ cycle the code can change phase and is used to encode a 1500 bit long message, which contains "almanac" date for the other GPS satellites.

There are 32 PN codes designated by the GPS authority. Twenty-four of the PN codes belong to current GPS satellites in orbit and the $25^{th}$ PN code is designated as not being assigned to any GPS satellite. The remaining PN codes are spare codes that may be used in new GPS satellites to replace old or failing units. A GPS receiver may, using the different PN sequences, search the signal spectrum looking for a match. If the GPS receiver finds a match, then it has identified the GPS satellite that generated that signal. Ground based GPS receivers use a variant of radio range measurement methodology, called trilateration, to determine the position of the ground based GPS receiver.

The trilateration method depends on the GPS receiving unit obtaining a time signal from the GPS satellites. By knowing the actual time and comparing it to the time that is received from the GPS satellites that receiver can calculate the distance to the GPS satellite. If, for example, the GPS satellite is 12,000 miles from the receiver, then the receiver must be located somewhere on the location sphere defined by a radius of 12,000 miles from that GPS satellite. If the GPS receiver than ascertains the position of a second GPS satellite it can calculate the receiver's location based on a location sphere around the second GPS satellite. The two spheres intersect and form a circle with the GPS receiver being located somewhere within that location circle. By ascertaining the distance to a third GPS satellite the GPS receiver can project a location sphere around the third GPS satellite. The third GPS satellite's location sphere will then intersect the location circle produced by the intersection of the location spheres of the first two GPS satellites at just two points. By determining the location sphere of one more GPS satellite whose location sphere will intersect one of the two possible location points, the precise position of the GPS receiver is determined to be the location point located on the Earth. The fourth GPS satellite is also used to resolve the clock error in the receiver. As a consequence, the exact time may also be determined, because there is only one time offset that can account for the positions of all the GPS satellites. The trilateration method may yield positional accuracy on the order of 30 meters; however the accuracy of GPS position determination may be degraded due to signal strength and multipath reflections.

As many as 11 GPS satellites may be received by a GPS receiver at one time. In certain environments such as a canyon, some GPS satellites may be blocked out, and the GPS position determining system may depend for position information on GPS satellites that have weaker signal strengths, such as GPS satellites near the horizon. In other cases, overhead foliage may reduce the signal strength that is received by the GPS receiver unit.

Recently mobile communication devices such as cellular telephones, or mobile handsets, have been incorporating GPS receiver technology using multiple dedicated semiconductor chips to implement a communication portion and other dedicated semiconductor chips to implement a GPS sub-system of the mobile communication device. Such mobile handsets operate in connection with a mobile communications network for telecommunications services, and in connection with the GPS system to obtain the position of the mobile handset. In mobile handsets with integrated GPS receivers, time information obtained from the mobile communications network may be provided to the GPS receiver in order to reduce the search space for detecting satellites. Systems that make time information from a mobile communications network available to the GPS receiver are known generally as assisted GPS systems (A-GPS). In A-GPS systems, accurate time information can be readily provided from the network to help reduce TTFF (time to first fix)—an important GPS performance parameter.

Within a mobile handset, the time information may be provided by a host processor to the GPS receiver through a serial port. A pulse on a separate line from the host processor marks the precise instant when the time record sent over the serial port is true. Many handsets, however, do not have a GPS receiver physically co-located with the host processor. Systems with GPS receivers (such as GPS handsets, navigation systems, automobiles, and other examples) may be linked to mobile communications handsets through a wireless connection, which is unable to provide time aiding information through a physical link. In addition, GPS receivers may not be capable of communicating with a mobile communications handset. Such GPS receivers would not be capable of using A-GPS to obtain time information.

Therefore, there is a need for methods and systems that allow GPS receivers not physically co-located with a sub-system of a network capable of A-GPS to obtain time information.

SUMMARY

According to one aspect of the subject matter disclosed, a system for providing corrected GPS time information is provided. The system includes a mobile handset having a first local area network (LAN) interface to a LAN and a GPS time. The first LAN interface includes a first LAN clock and a handset time info handler to receive a time info request, to capture the GPS time and first LAN clock time, and to send the captured GPS time and first LAN clock time in response to the request. The system also includes a GPS-enabled device having a second LAN interface to the LAN. The second LAN interface includes a second LAN clock synchronized with the first LAN clock. The GPS-enabled device includes a GPS device time info handler. The GPS device time info handler sends requests for time information over the LAN and receives, in response to the request, the captured LAN clock time and the captured GPS time from the first LAN interface. The GPS device time info handler subtracts the captured LAN clock time from the LAN clock time, and adds the difference to the captured GPS time. The result is a corrected GPS time.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

In the following description, reference is made to the accompanying drawings that form a part hereof, and in which is shown by way of illustration one or more specific implementations in which the invention may be practiced. It is to be understood that other implementations may be utilized and structural changes may be made without departing from the scope of this invention.

Figure 1:
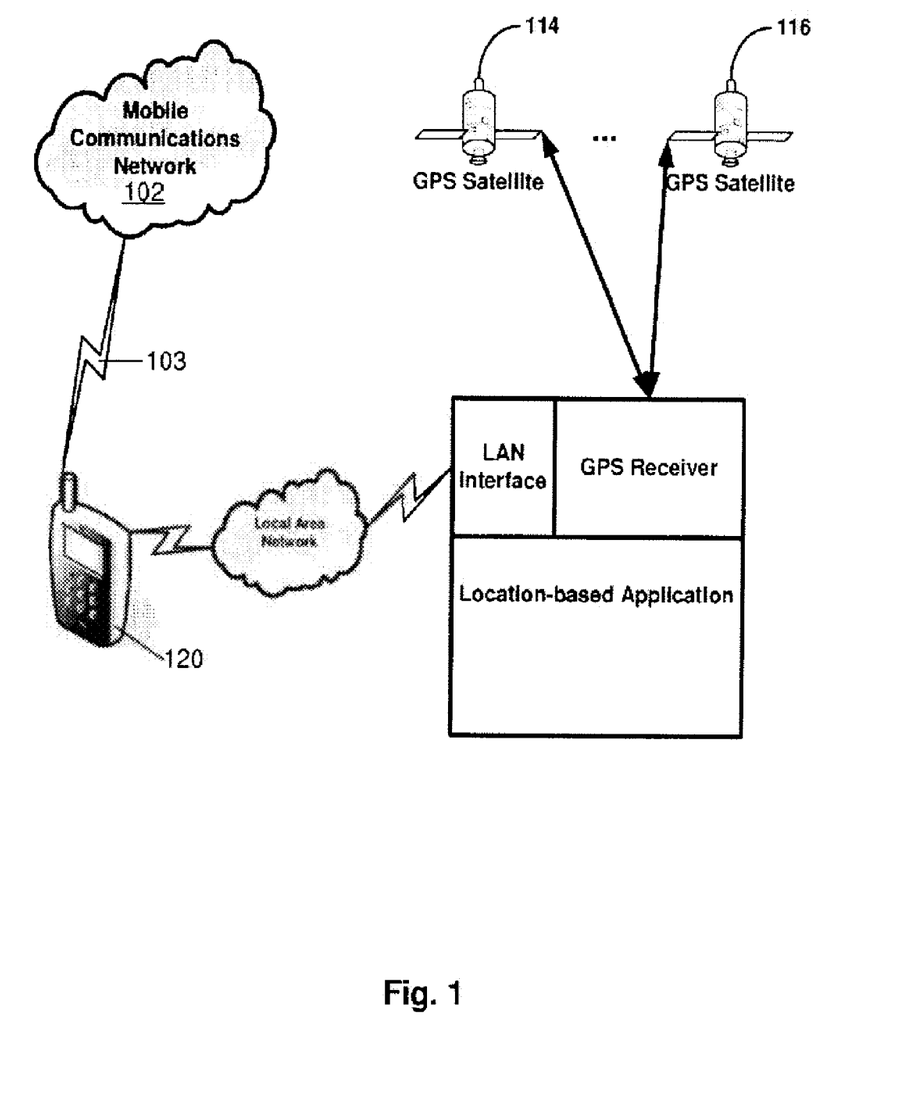
FIG. 1 is a block diagram of an example of a system for providing time information consistent with the present invention.

FIG. 1 is a block diagram of an example system 100 for providing time aiding information to a GPS receiver 150. The system 100 includes a mobile communications network 102 and a GPS system 104. The mobile communications network 102 provides telecommunications services to a mobile handset 120. The GPS system 104 includes a plurality of satellites 114, 116, which provide positioning data to the GPS receiver 150. The GPS receiver 150 in the system 100 in FIG. 1 may be implemented in a location-based system 110, which is a GPS-enabled device that includes a location-based application 170.

The mobile communications network 102 may be any telecommunications network that provides any type of wireless service. A cellular telecommunications network is one example of such a network. More specific examples of such networks include mobile telecommunications networks based on GSM, CDMA, TDMA, and other signaling protocols. The mobile communications network 102 communicates with the subscriber mobile handset 120 using the network's signaling protocol over a communication link 103. The mobile handset 120 includes a GPS time that is periodically updated. In one example, the mobile handset 120 may include its own resident GPS receiver and a system fin aiding the GPS receiver by providing updated time and position information. The GPS time and position information may be available to aid GPS-enabled devices connected to a local area network (LAN) using examples of systems and methods consistent with the present invention.

The mobile handset 120 may also communicate over a second network, such as a short-range wireless network 106 over a wireless communication link 105. For purposes of this specification, a short-range wireless network 106 may include any wireless network (even a node-to-node, or peer-to-peer connection) and specifically includes personal area networks, such as those based on the Bluetooth™ standard. The short-range wireless network 106 may also include wireless connections based on other wireless technologies, such as infra-red. The short-range wireless network 106 includes a synchronized clock system that enables each node connected to the short-range wireless network 106 to include a network clock that is synchronized with every oilier node in the short-range wireless network 106. In one example, the short-range wireless network 106 is a Bluetooth™ Piconet™ where the mobile handset 120 is the Master Bluetooth™ node and the location-based system 110 is the Slave Bluetooth™ node. Embodiments described herein are described in the context of using the Bluetooth™ standard whether employed in a Bluetooth™ Piconet™ or in a peer-to-peer Bluetooth™ connection. Those of ordinary skill in the art will appreciate that Bluetooth™ is referred to herein as an example, and is not intended to limit the scope of the invention in any way.

The GPS-enabled (such as location-based system 110 in FIG. 1) may send requests for time information to another node on the short-range wireless network 106, such as the mobile handset 120. The mobile handset 120 may include a network clock synchronized with the network clock on the GPS-enabled device. Upon receiving the request, the mobile handset 120 may "capture" the GPS time and the network clock at the time of the request. In response to the request, the mobile handset 120 may send the captured GPS time and network clock time to the GPS-enabled device. The GPS-enabled device may then calculate the corrected GPS time by subtracting the captured network clock time from the network clock time on the GPS-enabled device and then adding the difference to the captured GPS time.

Those of ordinary skill in the art will also appreciate that the mobile communications network 102 is not to be limited to cellular communications networks. Any network that may provide any type of service to a mobile handset may be used in alternative examples. The mobile handset 120 in the example shown in FIG. 1 is a mobile telecommunications handset such as a cellular telephone. However, in other examples, the mobile handset 120 may be a device for performing a wide variety of applications over a wireless network (such as the mobile communications network 102. For example, the mobile handset 120 may be a personal digital assistant ("PDA") having a wireless network interface (e.g. as just one example, Wi-Fi capability) in addition to a short-range wireless network interface.

The location-based system 110 in the example in FIG. 1 may be any system that uses GPS services to perform a location-based application 170. The location-based system 110 in FIG. 1 may include a GPS receiver 150 and a short-range wireless network interface 160. The GPS receiver 150 obtains positioning data to perform GPS positioning functions via links to several GPS satellites 114, 116. The location-based application 170 may include navigation applications such as navigation systems in automobiles, handheld navigation devices, a PDA with navigation or map functions, or any other application that may operate in a device that uses GPS services.

Figure 2:
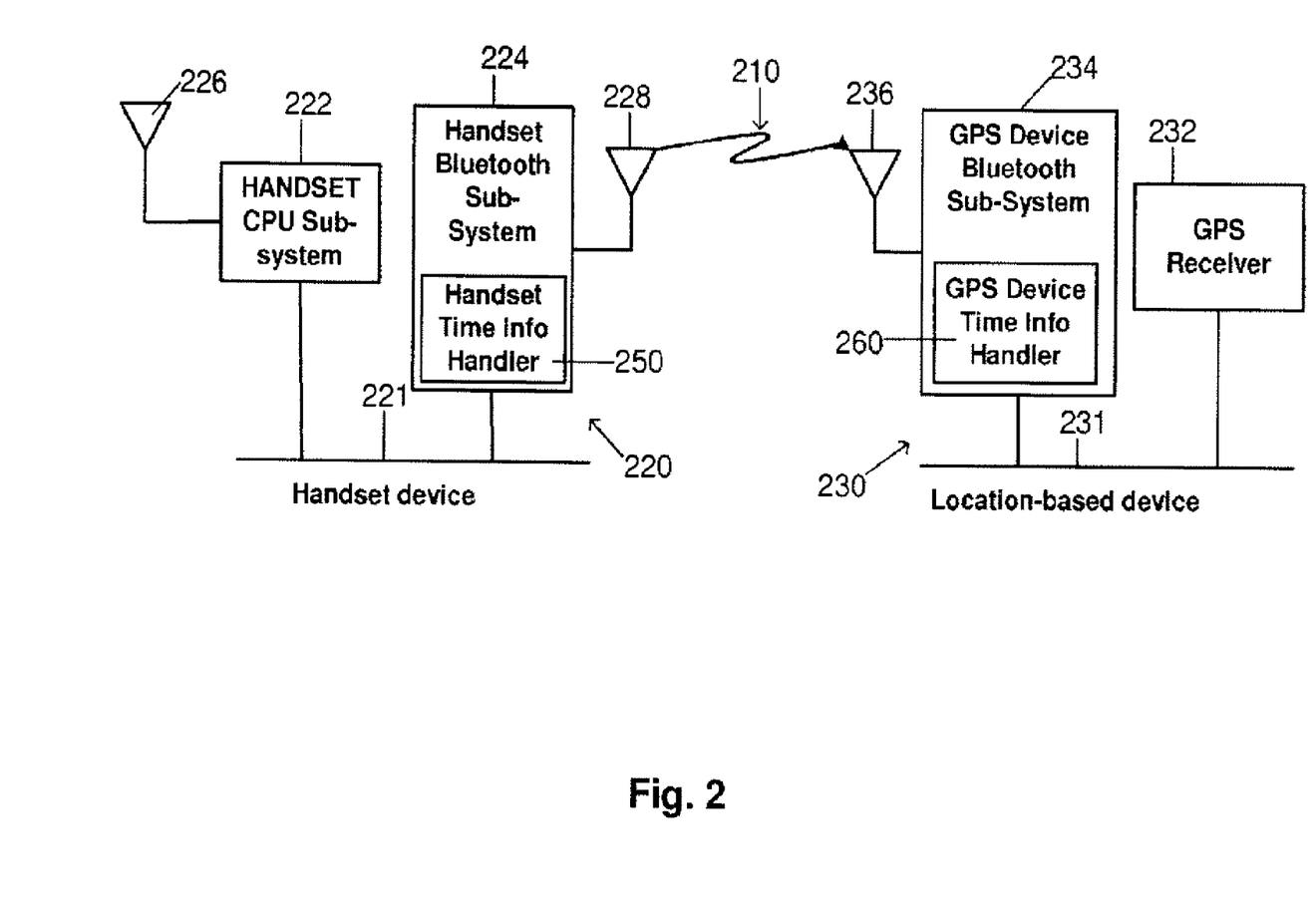
FIG. 2 is a block diagram of a portion of the system illustrated in FIG. 1.

The example system 100 in FIG. 1 advantageously provides time-aiding information for the GPS receiver 150 in the location-based system 110 wirelessly via the mobile handset 120. FIG. 2 is a block diagram depicting operation of functions for providing time-aiding information from a mobile handset 220 to a GPS-based device 230. The mobile handset 220 in FIG. 2 includes a handset CPU sub-system 222 and a handset Bluetooth™ sub-system 224 that communicate over an internal handset bus system 221. The handset CPU sub-system 222 communicates over a larger network (such as, for one example, a mobile telecommunications system) via antenna 226. The mobile handset 220 in FIG. 2 receives GPS time information from the WAN and uses the handset Bluetooth™ sub-system 224 to distribute the time information to other devices such as the GPS-based device 230. The mobile handset 220 communicates over a Bluetooth™ connection 210 via antenna 228.

The GPS-based device 230 includes a GPS receiver 232 and GPS-device Bluetooth™ sub-system 234 that communicate over an internal GPS-based device bus system 231. The GPS receiver 232 performs positioning functions via the GPS system. The GPS receiver 232 may request time information from an aiding network. The GPS receiver 232 in the system in FIG. 2 may request time information via the GPS device Bluetooth™ sub-system 234. The GPS device Bluetooth™ sub-system 234 includes a GPS device time info handler 260 to manage requests for time information.

The example system shown in FIG. 2 implements Bluetooth™ connectivity to transfer time information. Bluetooth™ enabled devices advantageously implement a 28 bit clock having a resolution of 312.5 µsecs. When two or more Bluetooth™ enabled devices are configured (or "paired") to communicate wirelessly according to the Bluetooth™ standard, the devices ensure that their clocks are in synchronization. The synchronized Bluetooth™ clocks may be used as a reference in retrieving time information. Those of ordinary skill in the art will appreciate that any personal area network (or local area network) may be used as well, particularly where such networks implement, or may be made to implement, network-wide synchronized clocks.

In general, the GPS-based device 230 may send requests for time information to the handset 220 over the Bluetooth™ connection 210. In response, the handset 220 may send the GPS time and data indicative of the elapsed time between a reading of the GPS time and receipt of the time information at the GPS-based device 230.

Figure 3:
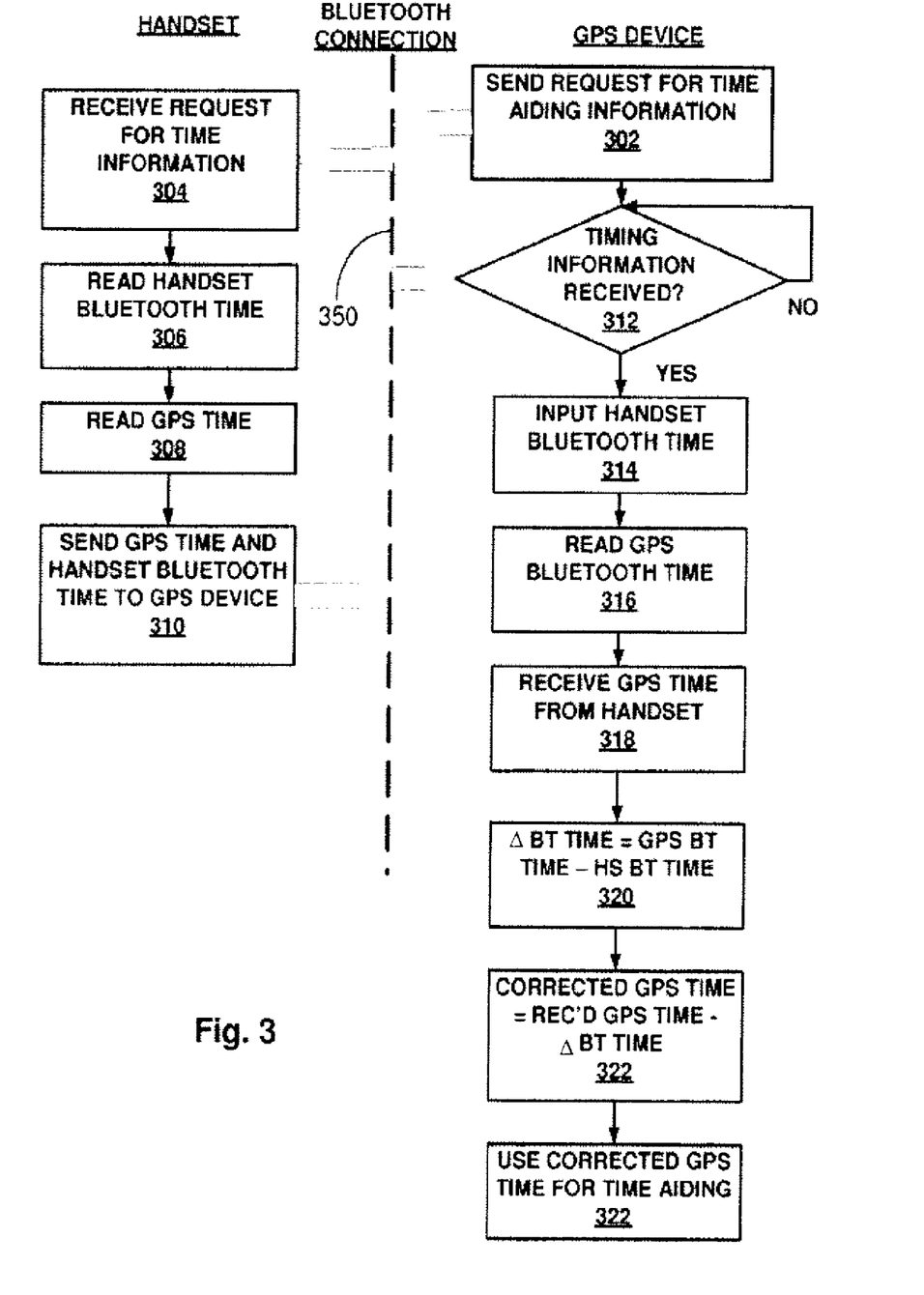
FIG. 3 is a flowchart illustrating operation of example methods for obtaining time-aiding information using the system of FIG. 2.

FIG. 3 is a flowchart illustrating operation of example methods for obtaining time-aiding information using the system of FIG. 2. FIG. 3 shows steps (304-310) performed by the handset device 220, steps (302, 312-324) performed by the GPS-based device 230 (in FIG. 2), and a Bluetooth™ connection at 210 (350), which is the communications link between the handset 220 and the GPS-based device 230. The methods illustrated by the flowcharts in FIG. 3 may be performed in software, hardware, or a combination of hardware end software.

The GPS-based device 230 may make a request at step 302 for time-aiding information by sending a message containing the request to the handset 220 via the Bluetooth™ connection 210. In one example, the GPS-based device 230 may make such a request during power-up of the GPS-based device 230 when the GPS-based device 230 is attempting to make a first fix on its location. Having the time-aiding information as soon as possible would reduce the time to first fix (TTFF) making the positioning functions of the GPS receiver 232 available more quickly. At step 304 in FIG. 3, the request for time information is received by the handset Bluetooth sub-system 224 (in FIG. 2) for processing by the handset time info handler 250 (in FIG. 2). At step 306 of FIG. 3, the handset Bluetooth™ time is read and stored in a memory location or a register for preparation to send to the GPS-based device 230. The handset Bluetooth™ time is the time maintained by the handset Bluetooth™ sub-system 224. The handset Bluetooth™ time is maintained in synchronization with the GPS-based device Bluetooth™ time, which is kept by the GPS-device Bluetooth™ sub-system 234.

At step 308, the GPS time stored in the handset 220 is also read and stored in a memory location or register for preparation to send to the GPS-based device 230. The GPS time may be a clock maintained by the handset CPU sub-system 222 through communications with the mobile communications network 102 (in FIG. 1). At step 310, the GPS time and the handset Bluetooth™ time are communicated via the Bluetooth™ connection 210 to the GPS-based device 230.

As symbolized by decision block 312, the GPS-based device 230 waits for a response to the request for time-aiding information. The actual "waiting" may be implemented using a polling routine, or implemented using a relatively high priority interrupt, as just a few examples. If the request was received, the GPS-device time info handler 260 inputs the handset Bluetooth™ time at step 314. At step 316, the GPS-device time info handler 260 inputs the GPS-Bluetooth™ time from a Bluetooth clock maintained by the GPS-Bluetooth sub-system 234. In accordance with the Bluetooth™ standards, the GPS-Bluetooth clock is kept in synchronization with the Bluetooth™ clock in the handset Bluetooth™ sub-system 224. At step 318, the GPS-device time info handler 260 inputs the GPS time received from the handset.

At step 320, the GPS-device time info handler 260 calculates a ΔBT time, which is the time that elapsed between the reading of the handset Bluetooth™ clock and the reading of the GPS-device Bluetooth™ clock. The ΔBT time is then added to the GPS time at step 322. The sum of the GPS time and the ΔBT time is a corrected GPS time that may be used by the GPS receiver as the time-aiding information at step 324.

Figure 4:
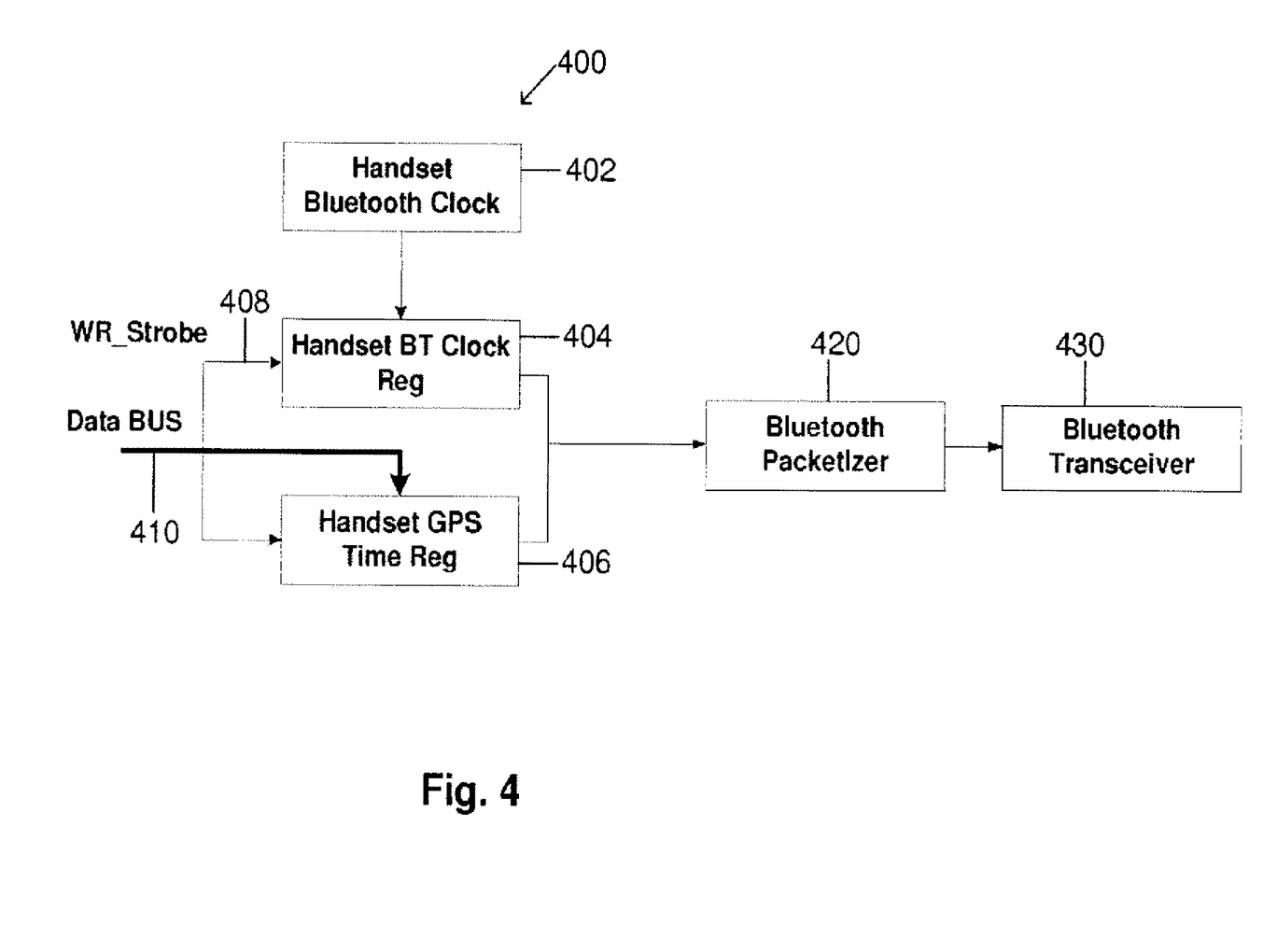
FIG. 4 is a block diagram depicting operation of a master time information handler in a communication sub-system of the handset device in FIG. 2.

FIG. 4 is a block diagram of a clock and register set 400 operating in the handset 220 shown in FIG. 2 that may be used by the handset time info handler 250 to obtain time-aiding information. The components of the clock and register set 400 may include a handset Bluetooth™ clack 402, a handset Bluetooth™ clock register 404, and a handset GPS time register 406. FIG. 4 also shows a Bluetooth packetizer 420 and Bluetooth transceiver 430 for handling the handset GPS and handset Bluetooth times.

The handset Bluetooth™ clock 402 in FIG. 4 is a 28-bit clock having a resolution of 312.5 µsecs configured in accordance with the Bluetooth™ standard. The handset Bluetooth clock 402 is continuously running. The handset GPS time register 406 may be used for holding the GPS time prior to sending the GPS time to the GPS-based device.

When a request for time-aiding information is received at the handset 220, the time value in the handset Bluetooth™ clock 402 is transferred to the handset Bluetooth clock register 404. The handset GPS time is transferred to the handset GPS time register 406 via a data bus connection 410 to the handset CPU sub-system 222. A write signal 408 (WR_Strobe in FIG. 4) may be enabled to trigger the transfer of the handset Bluetooth™ clock 402 value to the handset Bluetooth™ clock register 404 and, simultaneously, a write operation that transfers the GPS time to the handset GPS time register 406 via the data bus 410. In one example, the write signal 408 and the data bus 410 are triggered or activated under control of a computer program. Such a computer program may be an interrupt handler that may be executed when an interrupt signal is triggered to interrupt execution of the program control hardware. Such an interrupt signal may be triggered by a request for time-aiding information. In another example, the write signal 408 and data bus 410 may be activated by hardware control. For example, the request for time-aiding information may trigger a sequence of signals that results in triggering the write signal 408 and activating the data bus 410 to contain the GPS time when the write signal 408 is triggered to capture the GPS time and Bluetooth time simultaneously into the respective registers.

The captured GPS and Bluetooth time information are communicated to the Bluetooth packetizer 420. The Bluetooth packetizer 420 may include hardware and software components for creating data packets according to the Bluetooth standard. The Bluetooth packetizer 420 may be part of the Bluetooth system in the handset so that the packetizer 420 may receive data from other handset components. The Bluetooth system may also include a Bluetooth transceiver 430, which may include hardware and software components for sending and receiving data packets wirelessly over a Bluetooth connection. Those of ordinary skill in the art will appreciate that the Bluetooth connection between the handset and the GPS-based device may be established following the Bluetooth standard for establishing connections between Bluetooth-enabled devices.

Figure 5:
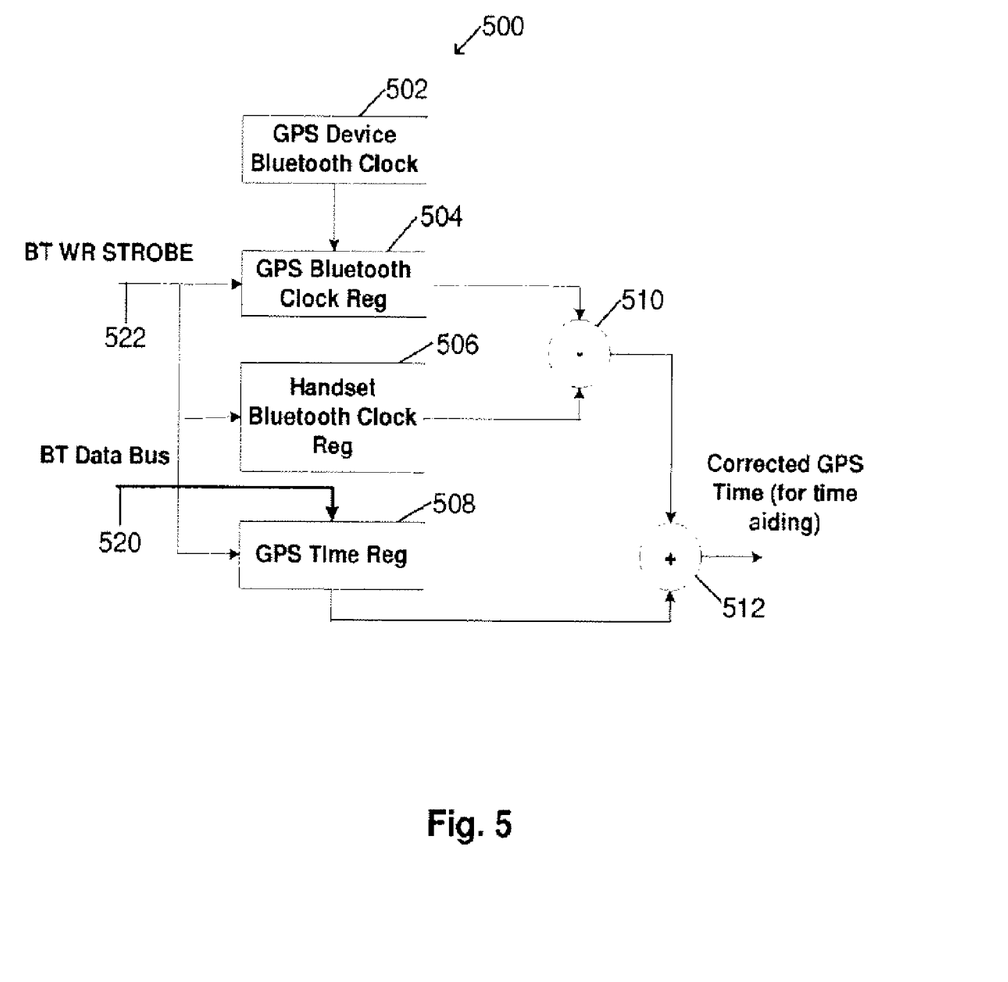
FIG. 5 is a block diagram depicting operation of a slave time information handler in a communication sub-system of the GPS device in FIG. 2.

FIG. 5 is a block diagram of a clock and register set 500 operating in the GPS-based device 230 shown in FIG. 2 that may be used by the GPS-device time info handler 260 to obtain time-aiding information. The components 500 include a GPS-device Bluetooth™ clock 502, a GPS-device Bluetooth™ clock register 504, a handset Bluetooth™ clock register 506 and a GPS time register 508. The GPS-device Bluetooth™ clock 502 in FIG. 5 is a 28-bit clock having a resolution of 312.5 µsecs configured according to the Bluetooth™ standard. The GPS-device Bluetooth clock 502 is always running. The handset GPS time register 406 may be used for holding the GPS time prior to sending the GPS time to the GPS-based device. The handset Bluetooth™ clock register 404 may be used for holding the handset Bluetooth™ clock value prior to sending the handset Bluetooth™ clock time to the GPS-based device.

When the GPS-device has a need for time-aiding information, the GPS receiver 232 sends a request for time-aiding information to the handset 220 wirelessly via the GPS-device Bluetooth™ sub-system 234. The handset 220 responds wirelessly with timing data that includes the value of the GPS time maintained by the handset CPU sub-system and the value of the handset Bluetooth™ clock. When the timing data is received by the GPS-device Bluetooth™ sub-system 234, the handset Bluetooth™ clock value is written into the handset Bluetooth™ clock register 506. At the same time, the value of the GPS-device Bluetooth™ clock 502 is written into the GPS Bluetooth™ clock register 504. The handset Bluetooth™ clock value in the handset Bluetooth™ clock register 506 is then subtracted from the GPS-device Bluetooth clock value in the GPS-device Bluetooth clock register 504 using a subtraction function 510. Because the time that elapses between the reading of the GPS time at the handset and the receipt of the GPS time at the GPS-device may be significant, the GPS-device time info handler 260 in FIG. 5 advantageously corrects the GPS time to account for the elapsed time. The GPS-device Bluetooth clock 502 and the handset Bluetooth clock 402 are maintained in synchronization. Thus, the difference between the time value in the GPS Bluetooth clock register 504 and the handset Bluetooth clock register 506 represents the elapsed time. This difference is added to the GPS time in the GPS time register 508 at adder 512 to generate the corrected time, which is then used as the time-aiding information.

Those of ordinary skill in the art will appreciate that the registers and clocks 400 and 500 in FIGS. 4 and 5 may be implemented as hardware registers and clocks or as data structures in software, or a combination of hardware and software. The registers and clocks 400 and 500 may be controlled by software program control that may implement, for example, methods described with reference to FIG. 3.

Figure 6:
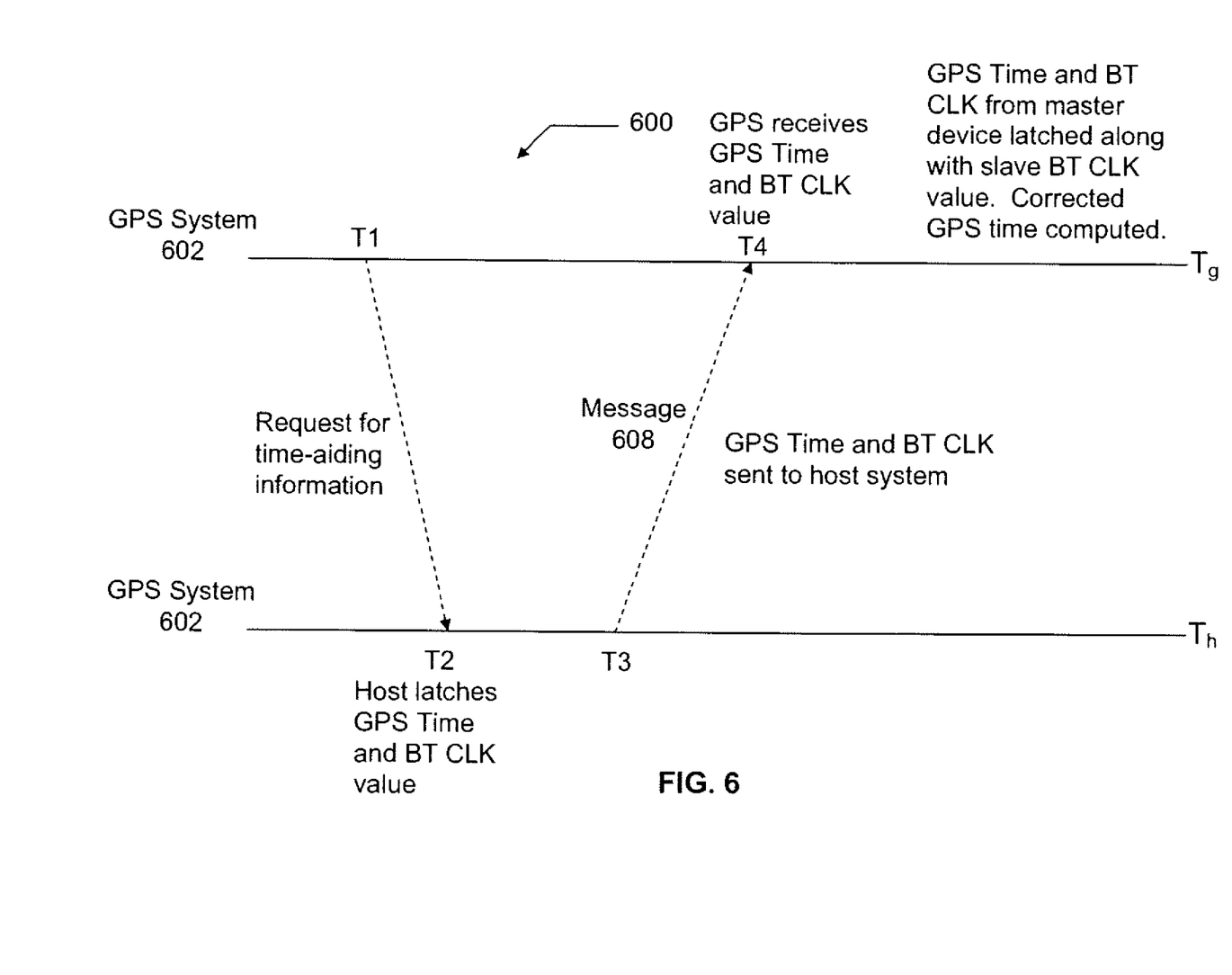
FIG. 6 is a timeline illustrating operation in a time-aiding information request from the GPS-enabled device of FIG. 2.

FIG. 6 is a timeline illustrating operation of an example of a request for time-aiding information from an example GPS system 602 to an example host system 604. The time line is divided in two, a first time line $T_g$ and a second time line $T_h$, to illustrate the timing of events from the perspective of each of the GPS system 602 and the host system 604. At a first time, T1, the GPS system 602 sends a request for time-aiding information 606 to the host system 604. The host system 604 receives the message 606 a short time later at time T2. The host system 604 processes the request by latching the GPS time and the host Bluetooth™ clock value and preparing the values for sending to the GPS system 602. At a time T3, the host system 604 sends a message 608 responsive to the request for time-aiding information to the GPS system 602. The GPS system 602 receives the response at time T4, a relatively short time after the host system 604 sends the response at T3. At time T4, the GPS time and host Bluetooth™ clock are received by the GPS system 602. The GPS system 602 latches a GPS Bluetooth™ time and uses the GPS time, the host Bluetooth™ time and the GPS Bluetooth™ time to calculate a corrected GPS time.

As can be seen in FIG. 6, the corrected GPS time accounts for the time elapsed between T2 and T3, and between T3 and T4. The elapsed time advantageously has no affect on the accuracy of the corrected GPS time because the GPS time is latched substantially simultaneously with the host Bluetooth™ time. Thus, when the GPS system 602 receives the GPS time, the GPS system 602 may correct the time to account for the elapsed time using the difference between the host Bluetooth™ clock and the GPS Bluetooth™ clock, which are synchronized and able to provide an accurate elapsed time and corrected GPS time.

Figure 7:
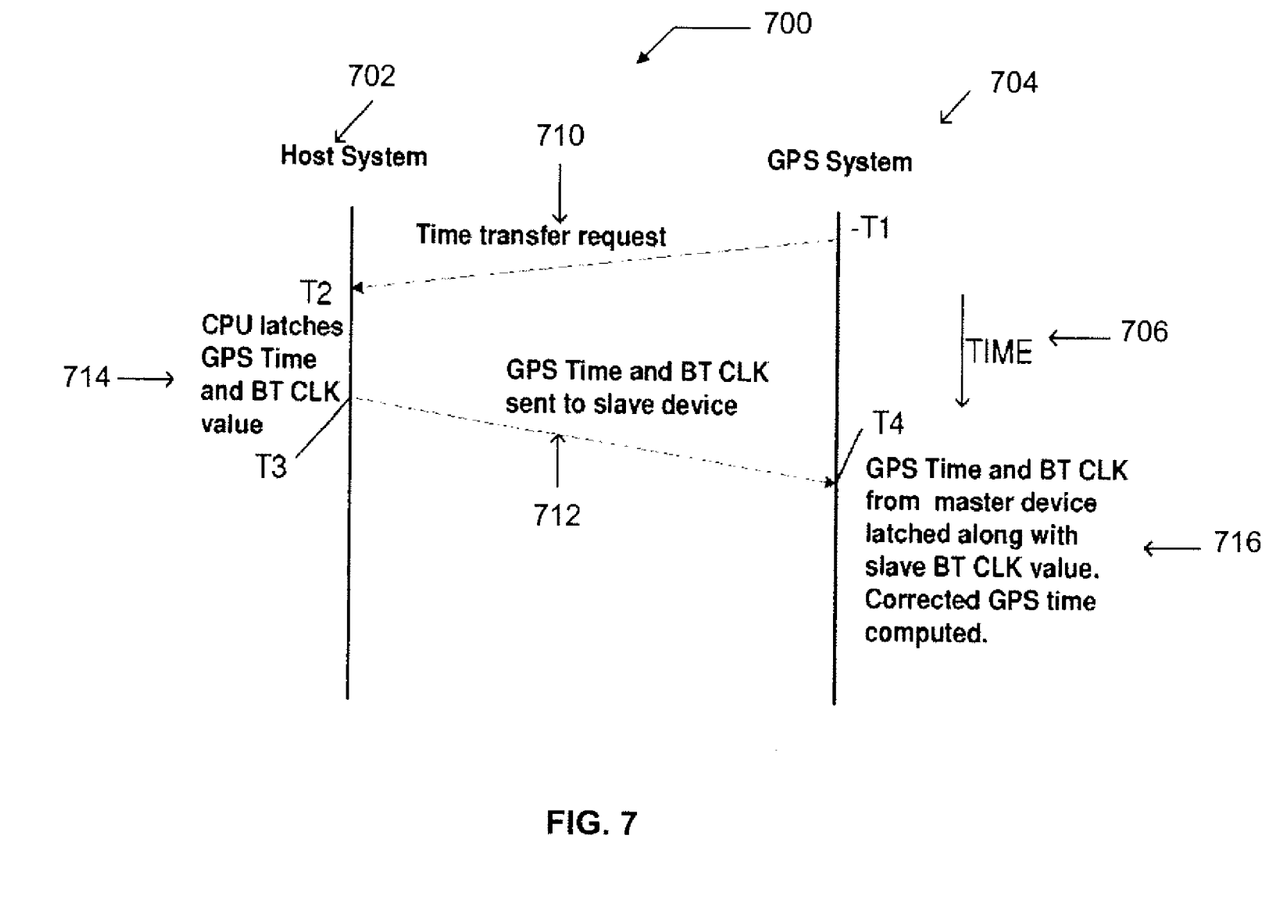
FIG. 7 is a timeline illustrating operation in a time information request from the GPS-enabled device of FIG. 2.

FIG. 7 is a timeline 700 illustrating operation in a time information request to a host system 702 from the GPS system 704. The timeline 700 proceeds with time elapsing in the downward direction as shown at 706. The GPS system 704 may need GPS time information to enable the GPS system to, for example, power-up and locate itself in the GPS environment. At time T1, the GPS system 704 may send a request for time information to the host system 702. The time info request is transmitted at 710 to the host system 702. The host system 702 receives the request at time T2. When the host system 702 receives the request, the host system 702 executes hardware and/or software at 714 that latches, or captures, the GPS time and the network clock time (e.g., the Bluetooth time) simultaneously into registers. The network clock time may be time T2. At time T3, the host system 702 sends the captured network clock time and the captured GPS time to the GPS system 704. The request at 712 is received by the GPS system 702 at time T4. At process 716, the GPS system latches its network clock time (e.g., Bluetooth time), which may be time T4. The GPS system 704 then subtracts the captured network clock time, time T2, from its network clock time, time T4. The difference (T4–T2) is then added to the captured GPS time to obtain the corrected GPS time.

It will be understood by those of ordinary skill in the art that while the focus of the above description of examples consistent with the invention has been on implementation with a Bluetooth-enabled network, any local area network having a system of synchronized clocks maintained with a suitable resolution may be used as well.

It will be understood, and is appreciated by persons skilled in the art, that one or more functions, modules, units, blocks, processes, sub-processes, or process steps described above may be performed by hardware and/or software. If the process is performed by software, the software may reside in software memory (not shown) in any of the devices described above. The software in software memory may include an ordered listing of executable instructions for implementing logical functions (i.e., "logic" that may be implemented either in digital form such as digital circuitry or source code or in analog form such as analog circuitry or an analog source such as an analog electrical sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" is any means that may contain, store, communicate, propagate, or transport the program for use by or in connection with the instruction execution system, apparatus, or device. The computer-readable medium may selectively be, for example but not limited to, an electronic, magnetic, optical, electromagnetic, infrared, or semiconductor system, apparatus, or device. More specific examples, but nonetheless a non-exhaustive list, of computer-readable media would include the following: an electrical connection (electronic) having one or more wires, a portable computer diskette (magnetic), a random access memory ("RAM") (electronic), a read-only memory ("ROM") (electronic), an erasable programmable read-only memory ("EPROM" or Flash memory) (electronic), an optical fiber (optical), and a portable compact disc read-only memory ("CDROM") (optical). Note that the computer-readable medium may even, be paper or another suitable medium upon which the program is printed, as the program can be electronically captured, via, for instances optical scanning of the paper or other medium, then compiled, interpreted or otherwise processed in a suitable manner if necessary, and then stored in a computer memory.

What is claimed is:

1. A Global Positioning System (GPS)-enabled device comprising:
    a GPS receiver to receive GPS signals from GPS satellites and providing GPS time;
    a short-range wireless network interface to a short-range wireless network connected to at least one other node, the short-range wireless network interface including a network clock to provide a network clock time synchronized with the network clock in the at least one other node; and
    a GPS device time info handler to send requests for time information over the short-range wireless network and to receive, in response to the requests, a captured network clock time and a captured GPS time from the at least one other node, the GPS device time info handler being operable to subtract the captured network clock time from the network clock time, and to add the difference to the captured GPS time, the result being a corrected GPS time.

2. The GPS-enabled device of claim 1, where the at least one other node is a mobile handset.

3. The GPS-enabled device of claim 1, where the short-range wireless network is a Bluetooth™ Piconet and the network clock is a Bluetooth™ clock.

4. The GPS-enabled device of claim 3, further comprising:
    a GPS Bluetooth™ clock register for receiving the Bluetooth™ clock time in the Bluetooth™ clock on the GPS-enabled device;
    a captured Bluetooth™ clock register for receiving the captured Bluetooth™ time; and
    a GPS time register for receiving the captured GPS time.

5. A system comprising:
    a mobile handset having a first network interface to a short-range wireless network and a GPS time, the first network interface including a first network clock to provide a network clock time, a handset time info handler operable to receive a time info request, to capture the GPS time and first network clock time, and to send the captured GPS time and first network clock time in response to the request; and
    a GPS-enabled device having a second network interface to the shod-range wireless network, the second network interface including a second network clock synchronized with the first network clock, the GPS-enabled device further including a GPS device time info handler, where the GPS device time info handler is operable to send requests for time information over the short-range wireless network and receive, in response to the requests, the captured network clock time and the captured GPS time from the mobile handset, the GPS device time info handler being further operable to subtract the captured network clock time from the network clock time, and to add the difference to the captured GPS time, the result being a corrected GPS time.

6. The system of claim 5, where the other node is a mobile handset.

7. The system of claim 5, where the short-range wireless network is a Bluetooth™ Piconet™ the network clock is a Bluetooth™ clock.

8. The system of claim 7, further comprising:
    a GPS Bluetooth™ clock register for receiving the Bluetooth™ clock time in the Bluetooth™ clock on the GPS-enabled device;
    a captured Bluetooth™ clock register for receiving the captured Bluetooth™ time; and
    a GPS time register for receiving the captured GPS time.

9. A method for obtaining a corrected GPS time, the method comprising:
    sending a request for time information to a mobile handset;
    receiving a captured GPS time and a captured network clock time from a network clock on the mobile handset in response to the request for time information;
    subtracting the captured network clock time from a network clock time from a network clock that is synchronized with the network clock on the mobile handset; and
    adding the difference to the captured GPS time to obtain the corrected GPS time.

* * * * *

UNITED STATES PATENT AND TRADEMARK OFFICE
CERTIFICATE OF CORRECTION

| | | |
|---|---|---|
| PATENT NO. | : 7,724,612 B2 | Page 1 of 1 |
| APPLICATION NO. | : 11/738359 | |
| DATED | : May 25, 2010 | |
| INVENTOR(S) | : Azim | |

It is certified that error appears in the above-identified patent and that said Letters Patent is hereby corrected as shown below:

IN THE SPECIFICATION

In Column 4, Line 9, delete "fin" and insert -- for --, therefor.

In Column 4, Line 27, delete "oilier" and insert -- other --, therefor.

In Column 5, Line 67, delete "end" and insert -- and --, therefor.

In Column 6, Line 54, delete "clack" and insert -- clock --, therefor.

In Column 9, Line 26, delete "electrical" and insert -- electrical, --, therefor.

In Column 9, Line 49, delete "even," and insert -- even --, therefor.

In Column 9, Line 51, delete "instances" and insert -- instance, --, therefor.

IN THE CLAIMS

In Column 10, Line 11, in Claim 3, delete "Piconet" and insert -- "Piconet™ --, therefor.

In Column 10, Line 30, in Claim 5, delete "shod-range" and insert -- short-range --, therefor.

Signed and Sealed this
Fourteenth Day of August, 2012

David J. Kappos
*Director of the United States Patent and Trademark Office*